US009196101B2

(12) United States Patent
Myllymaki

(10) Patent No.: US 9,196,101 B2
(45) Date of Patent: Nov. 24, 2015

(54) AUTOMATED CONTROL SYSTEM FOR MULTI-LEVEL AUTHORITY TO OPERATE ELECTRONIC AND ELECTRICAL DEVICES

(71) Applicant: Innohome Oy, Espoo (FI)

(72) Inventor: Matti Myllymaki, Helsinki (FI)

(73) Assignee: Innohome Oy, Espoo (FI)

(*) Notice: Subject to any disclaimer, the term of this patent is extended or adjusted under 35 U.S.C. 154(b) by 397 days.

(21) Appl. No.: 13/890,349

(22) Filed: May 9, 2013

(65) Prior Publication Data
US 2013/0300534 A1 Nov. 14, 2013

Related U.S. Application Data

(62) Division of application No. 12/308,061, filed as application No. PCT/FI2007/000161 on Jun. 6, 2007, now abandoned.

(30) Foreign Application Priority Data

Jun. 8, 2006 (FI) .................................... 20065390

(51) Int. Cl.
*G05B 19/00* (2006.01)
*G07C 9/00* (2006.01)
(Continued)

(52) U.S. Cl.
CPC ............ *G07C 9/00007* (2013.01); *G06F 21/31* (2013.01); *G06F 21/43* (2013.01); *G06F 21/88* (2013.01); *G08C 17/02* (2013.01); *G05B 15/02* (2013.01); *G06F 2221/2111* (2013.01); *G06F 2221/2113* (2013.01); *G08C 2201/42* (2013.01); *G08C 2201/61* (2013.01); *G08C 2201/91* (2013.01); *G08C 2201/93* (2013.01);

(Continued)

(58) Field of Classification Search
CPC ............. H04L 12/282; H04L 12/2803; H04L 12/2818; H04L 12/281; H04L 12/2834; G08C 17/02; G08C 2201/91; G08C 2201/93; G05B 15/02; H04M 1/72572; H04M 2242/30; H04M 2242/14
USPC ............... 340/5.64, 539.14, 4.62, 539.1, 540, 340/686.1, 687; 455/456.3, 456.1
See application file for complete search history.

(56) References Cited

U.S. PATENT DOCUMENTS 6,011,973 A 1/2000 Valentine et al.
6,088,450 A 7/2000 Davis et al.
(Continued)

FOREIGN PATENT DOCUMENTS

GB 2399924 9/2004
WO WO-97/39553 10/1997
(Continued)

*Primary Examiner* — Fekadeselassie Girma
*Assistant Examiner* — Kam Ma
(74) *Attorney, Agent, or Firm* — Drinker Biddle & Reath LLP

(57) ABSTRACT

An automated control system for multi-level authority to operate electronic and electrical equipment, the system including one or more wireless or wired controlled devices and one or more separate communicator and/or transmitter devices for an operation authorizing code and/or separate user identifiers for communicating the codes to a customer or a device. In the process of granting authorities to operate, the system utilizes, as positional data for a user or a device, the base station information of a mobile phone network and/or at close range a wired or wireless communication link, such as a bluetooth communication link.

8 Claims, 2 Drawing Sheets

(51) Int. Cl.
  *G06F 21/31* (2013.01)
  *G06F 21/43* (2013.01)
  *G06F 21/88* (2013.01)
  *G08C 17/02* (2006.01)
  *H04L 12/28* (2006.01)
  *H04M 1/725* (2006.01)
  *G05B 15/02* (2006.01)
  *H04M 3/38* (2006.01)

(52) U.S. Cl.
  CPC ............ *H04L12/281* (2013.01); *H04L 12/282* (2013.01); *H04L 12/2803* (2013.01); *H04L 12/2818* (2013.01); *H04L 12/2834* (2013.01); *H04M 1/72572* (2013.01); *H04M 3/382* (2013.01); *H04M 2242/14* (2013.01); *H04M 2242/30* (2013.01)

(56) References Cited

U.S. PATENT DOCUMENTS

| | | | |
|---|---|---|---|
| 6,122,486 A * | 9/2000 | Tanaka et al. | 455/68 |
| 6,233,448 B1 * | 5/2001 | Alperovich et al. | 455/417 |
| 6,505,046 B1 * | 1/2003 | Baker | 455/456.3 |
| 6,556,819 B2 * | 4/2003 | Irvin | 455/410 |
| 6,701,144 B2 * | 3/2004 | Kirbas et al. | 455/417 |
| 6,778,837 B2 | 8/2004 | Bade et al. | |
| 6,987,975 B1 | 1/2006 | Irvin et al. | |
| 7,072,945 B1 * | 7/2006 | Nieminen et al. | 709/217 |
| 7,135,969 B2 * | 11/2006 | McLellan | 340/540 |
| 7,136,709 B2 * | 11/2006 | Arling et al. | 700/65 |
| 7,155,305 B2 * | 12/2006 | Hayes et al. | 700/224 |
| 7,493,651 B2 * | 2/2009 | Vanska et al. | 726/2 |
| 7,757,803 B2 | 7/2010 | Fiske et al. | |
| 2002/0104878 A1 | 8/2002 | Seifert et al. | |
| 2002/0164997 A1 | 11/2002 | Parry | |
| 2003/0034877 A1 | 2/2003 | Miller et al. | |
| 2003/0124978 A1 * | 7/2003 | Virtanen | 455/41 |
| 2004/0059914 A1 | 3/2004 | Karaoguz | |
| 2005/0068169 A1 * | 3/2005 | Copley et al. | 340/539.13 |
| 2005/0071252 A1 | 3/2005 | Henning et al. | |
| 2006/0080408 A1 * | 4/2006 | Istvan et al. | 709/219 |
| 2006/0186199 A1 | 8/2006 | Parker | |
| 2006/0273885 A1 | 12/2006 | Thompson | |
| 2007/0032225 A1 * | 2/2007 | Konicek et al. | 455/417 |
| 2007/0185768 A1 * | 8/2007 | Vengroff et al. | 705/14 |
| 2008/0180228 A1 * | 7/2008 | Wakefield et al. | 340/310.11 |
| 2013/0300534 A1 * | 11/2013 | Myllymaki | 340/5.64 |

FOREIGN PATENT DOCUMENTS

| | | |
|---|---|---|
| WO | WO-98/25433 | 6/1998 |
| WO | WO-99/55102 | 10/1999 |
| WO | WO-00/62574 | 10/2000 |
| WO | WO-01/22767 | 3/2001 |
| WO | WO-02/093502 | 11/2002 |
| WO | WO-2004/090781 | 10/2004 |
| WO | WO-2005/110208 | 11/2005 |
| WO | WO 2005110208 A1 * | 11/2005 |

* cited by examiner

AUTOMATED CONTROL SYSTEM FOR MULTI-LEVEL AUTHORITY TO OPERATE ELECTRONIC AND ELECTRICAL DEVICES

CROSS-REFERENCE TO RELATED APPLICATIONS

This application is a division of U.S. application Ser. No. 12/308,061, filed on Oct. 27, 2009, there entire contents of which is herein incorporated by reference. U.S. application Ser. No. 12/308,061 is a 371 National Stage of PCT/FI2007/000161, filed on Jun. 6, 2007, which claims the benefit of Finnish Application No. 20065390, filed on Jun. 8, 2006.

BRIEF DISCUSSION OF THE BACKGROUND

The invention relates to a control system for the authority to operate electronic and electrical devices, the level of authority provided thereby being subject to change automatically according to location and service mode. The system includes one or more controlled devices and an individual security code controlling the operation thereof, and an identification of one or more authorized users according to a location or service conditions, as well as an automated control of the security code.

Traditionally, security relating to the use of electronic devices has been implemented either by a burglar alarm or an access code capable of denying unauthorized use of the device. Examples include burglar alarms and code-encrypted car radios as well as mobile phones. The purpose of security codes and alarm equipment is to prevent unauthorized use as well as a theft of the device. A problem with such protection methods is that people do not know how to use the equipment or become tired of repeatedly tapping codes, which thus remain unused. One unsolved problem is presented for example by portable entertainment equipment such as MP3 players, which have no protection whatsoever and which are consequently stolen directly from users. Car radios are also often used without a removable face panel, thus facilitating a theft thereof. The most interesting burglary objects at home and office are often electronic equipment for being the easiest items to convert into money. Home electronics is not generally protected but, instead, covered by burglar alarm systems which do not disable the equipment after theft. As for burglar alarms, it is known that break-ins cannot be prevented by those alone, such systems being subject to sabotage and over 50% of people not having them in active mode, which is why the best security could be provided by giving the object a visible protection and in such a way that the snatched piece of property cannot be exploited. Stealing electronic equipment during the course of shipping, storage and from retail stores is also relatively easy.

Controlling the service mode of home automation has been traditionally effected by an identifier or action calling for personal activity. Typically, a user sets the system with push buttons in an absence or long absence control mode and upon arrival at home in a presence control mode encrypted by a code or some other electronic identifier. In the latest solutions, the identification can be effected in a wireless and automatic manner, but the service is limited to the immediate ambience of an object and the level of absence cannot be determined automatically. A problem with these traditional solutions, e.g. in reference to arriving at home, is a slow response time of temperature regulation, the proper function of which would require earlier knowledge about when the users are due to arrive, which at present calls for an active personal remote control or the use of a control timer.

SUMMARY

It is an object of the invention to create a novel control system for operating authority, which grants a right to operate electronic and electrical devices automatically without the user's activity. The system has a range of application extending from granting the right of using a single mobile device all the way to automated control of a multi-level mode in building automation. In electronic devices, the right of use can also be verified from manufacture all the way to end use. The authorization is implemented by a protected operating code and by its automatic communication, depending either on the intended use of a device or on the location or relocation of an authorized person. The level of operating authority granted by the system may also change automatically according to the operating condition.

This object is accomplished on the basis of the characterizing features presented in the appended claims.

What is novel about the protection system is that the protection of an electronic device is automated in a way of enabling its utilization in devices intended for both children and the elderly. The protection system enables securing electronic and electrical devices without the user having to tap in security codes as protection takes place in the background automatically, such that the code can be put out by a place in which the device is used or by peripherals attached to the protected device. An applicable protection code can be provided by numerically encoded childproof locks of existing entertainment equipment or mobile phone protection codes, base station information, a Bluetooth communication link, with no modifications needed in the equipment. What is essentially novel is that the above-described existing codes are used and controlled automatically. Thus, a device can be protected by an individual code as early as at a manufacturing plant. The protection code put in at a manufacturing plant can be delivered, prior to first use of the device, through the supplier's logistic system, such that it will only be given to a purchasing customer at a sale transaction as a number, which is only activated by the user as the device is set up for active service. The protection code can also be delivered to a customer by way of existing electrical payment media or a mobile phone. A security code transmitter employed during service can be integrated with or disposed for example in a charging unit, a service power supply system, a local network, a service server, a burglar alarm system or a smart home control system, from all of which there is either a wired or wireless communication link to a protected device. The code is transmitted automatically under the control of an identification made by an operation-authorized person or the code communicated by peripherals or a service environment is identified by the protected device. The protection of portable equipment can be effected by using a charging unit with a code transmitter integrated therewith, whereby the battery can only be charged or the device programmed with a voltage source that is part of the device or encoded therefor.

Another novel feature is that a device cannot be used, except in a restricted manner, without a security code, the operation of e.g. a mobile phone being only possible by using previously programmed numbers or within the range of a desired base station and the listening of an MP3 player only for as long as long the battery stays alive. Neither can an MP3 player be loaded with new music without a charging unit or a PC encoded therefor. Hence, the electronic device is useless for anyone who snatches it. By virtue of a restricted operating mode, the maintenance of equipment is nevertheless possible without the code. In particular reference to the protection of mobile phones, the method makes it impossible for a snatcher to use the phone for his/her own purposes, which means that snatching mobile phones from young and elderly people is no longer tempting. The mobile phone may also use a prior known base station as a working condition, in which case it can only be used within the coverage range of accepted base stations or the protection status may change according to a base station. Thus, for example, the switched-on status of a charging unit allows for the programming of numbers and the exchange of a SIM card and a base station near home allows for unrestricted calling and a school-covering base station only allows for calling programmed numbers.

A further novel feature is also that a single joint code transmitter, mounted on or integrated with an electric distribution board or some other control device in the summer cabin, at home or in the office, which, on the basis of a bluetooth communication link and base station information regarding the home-covering mobile phone network, identifies the presence of accepted persons, is capable of protecting all desired pieces of home electronic entertainment equipment. The joint code transmitter provides a permanent or transient security code through the intermediary of an electrical network, a radio-frequency or infrared signal or some other prior known data transfer method whenever an authorized person arrives home or when he/she enters the range of a home-covering mobile phone base station. The system also enables an automatic identification of leaving home, as well as a long or short absence. The identification takes place by means of a person's mobile phone, whereby, when the person leaves the range of a home base station network, the program integrated with the mobile phone can transmit a message to the home automation system regarding the departure. When being for example far away from home, the mobile phone program or the operator service can be used for detecting a distance from home and to automatically control information regarding both departures and arrivals. Hence, for example the heating of a summer cabin can be remote-activated beforehand automatically when, on the basis of base station information, it is perceived that a person is heading towards the summer cabin and his/her arrival in the destination is ultimately identified by a bluetooth communication link, which is automatically switched on by the mobile phone once arriving within the range of a base station closest to the cabin.

In offices, the system can also be used as clearance monitoring information for denying the unauthorized use of all equipment or the PC of a particular person. In connection with computer hardware, it is possible to apply wireless or wired network technology for transmitting a code, wherein the "virtual transmitter" uses bluetooth identification. This also enables the protection of PDA equipment which uses a wireless local network, such that said equipment is only capable of operating within and not at all outside a desired area.

Another novel feature is that all electronic equipment aboard an automobile can be protected by means of a single code transmitter, which is concealed within structures or integrated with a bus used in the automobile and which is controlled by a bluetooth communication link automatically, whereby the user is neither required to memorize input codes nor to remove operating panels.

A still further novel feature is that the system enables setting up the devices in various modes as desired by the customer. The restricted mode can be switched on in such a way that TV is on only the presence of parents while children, whenever home by themselves, are only able to watch children's channels. A restricted mode can also be applied to a telephone whereby, consistently with the preceding example, in the parents' absence it is only possible to call accepted numbers and, when absent, the phone calls are automatically diverted only to an alarm center or emergency number.

BRIEF DESCRIPTION OF THE DRAWINGS

The invention will now be described in more detail with reference to the accompanying drawings, in which.

DETAILED DESCRIPTION OF THE SEVERAL EMBODIMENTS

Figure 1:
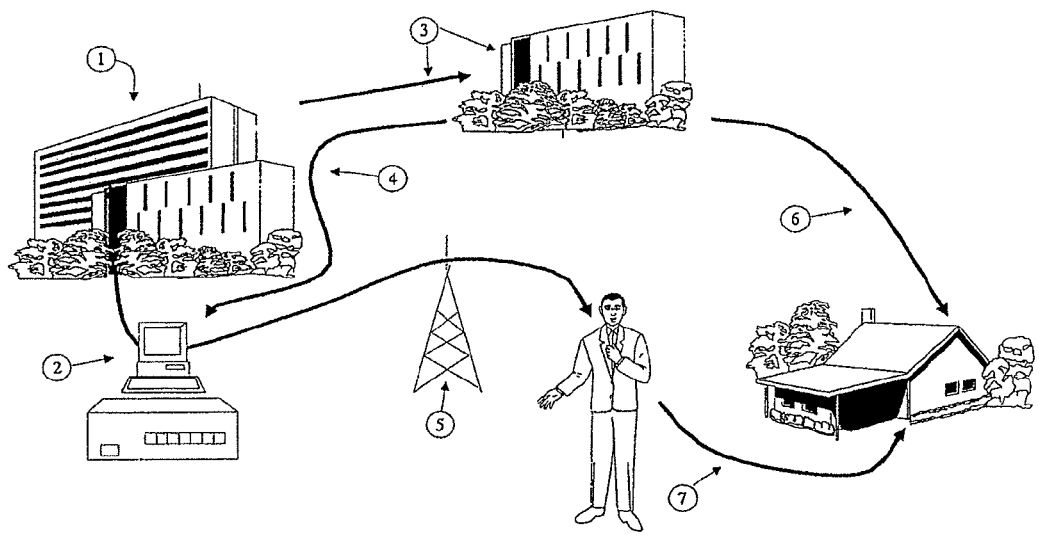
FIG. 1 shows the system in operation from manufacturing to retailing.

A system of the invention is first described in its operation in reference to FIG. 1. FIG. 1 shows the system in operation in terms of protecting the supply chain of electronic devices from a manufacturing plant to a retail store and to the end user. In the figure, the product has an individual protection code put in at a manufacturing plant 1, which code is sent to a logistic server 2 that transmits the security code to an end customer upon receiving a message from a retailer 3 regarding a sale transaction of the device and a mobile phone number for the end customer. The logistic server also verifies whether a product shipped from the manufacturing plant 1 is in the possession of an authorized retailer 3 as the sale transaction is confirmed. Hence, the customer picks up the product at the store 3 and the security code is transmitted to him/her by a mobile phone as he/she makes a call to the logistic server 2. This way a product 6 can be delivered all the way to a place of use and it is not until there 7 that the security code allows for operation of the device. Accordingly, the entire supply chain is secured from the factory all the way to the location of final use.

Figure 2:
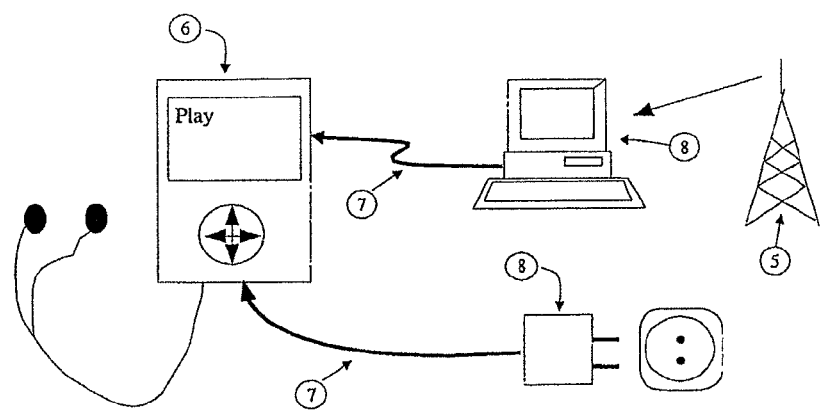
FIG. 2 shows the system in operation with entertainment equipment.

FIG. 2 depicts the system in operation with entertainment equipment. The protected product, for example an MP 3 player 6, is activated at the time of its first use by means of a security code obtained at the sale transaction, such that the code is tapped in by the keys of the device or a PC 8 or by way of the internet/a mobile phone network 5, the code becoming recorded in a user-right authorizing memory of the PC 8 and a charging unit 8. Thereafter, it is no longer necessary to input the code, whenever the device 6 is then connected to the PC or the charging unit, the latter shall confirm an operating authority by transmitting a security code 7 to the device. Thus, the device cannot be loaded or new data recorded in its memory without a charging unit or a PC authorizing the right of use 8.

Figure 3:
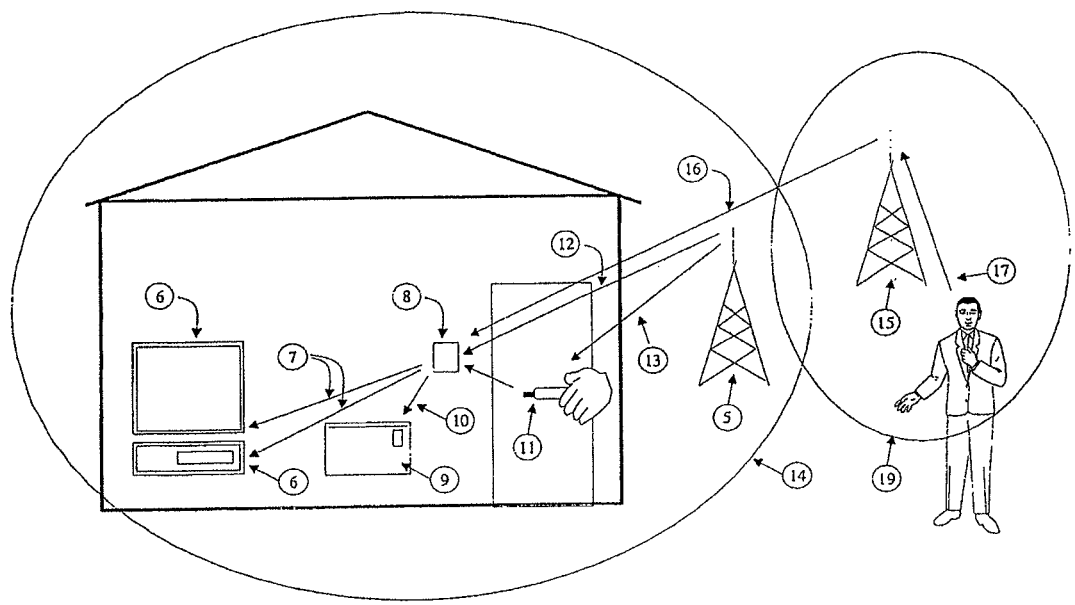
FIG. 3 shows the system in operation at home.

FIG. 3 depicts the system in operation at home. In the figure, protected devices 6 consist of home entertainment equipment, a standard feature of which is a childproof lock code that can be used as a security code all the way from a manufacturing plant. A device 8 authorizing the right of use is the home automation or security system operating device, featuring a wireless communication for transmitting a protection code 7 to entertainment equipment (IR), heaters (RF) 10, and a mobile phone (bluetooth) 11 or a mobile phone network 12. As the equipment is set up for first use, a protection code is supplied by way of either the mobile phone 11 or the mobile phone network 12 to the operation authority control device 8. When a person in possession of an operating authority leaves the place of use, that will be detected by a disconnection of the short-range mobile phone communication (bluetooth) 11, in which case the operating authority control device 8 activates childproof locks for the entertainment equipment. Under the control of an extra service by the mobile phone or the operator, a message is sent to the control device 8 about the user going outside the range of a mobile phone base station 16 covering the place of use. Upon receiving the message, the control device 8 sets heating of the site to a lower level, for example to 18 degrees. In the event that a person authorized to use the site goes away, for example abroad, he/she shall arrive within the range of a mobile phone network 15 in another country. Under the control of an extra service by the mobile phone or the operator, a message is sent to the control device 8 about the user stepping outside the country's borders for further dropping the temperature to a lower level. When the user returns, the control device 8 shall be respectively informed of an arrival in the home country or in the coverage range of a place-of-use base station, whereby the control device 8 sets up the heating stepwise to a normal level and activates the short-range mobile phone communication (bluetooth) 11. As the user arrives within a coverage range of the short-range communication (bluetooth) 11, the control device 8 shall switch off the childproof locks of the entertainment equipment. Hence, the method enables protecting entertainment equipment, such that the use thereof outside an authorized place of use shall be disabled and the protection thereof shall be controlled automatically. The control of an operating authority for heating proceeds also automatically without the user having to transmit any control commands in advance.

Figure 4:
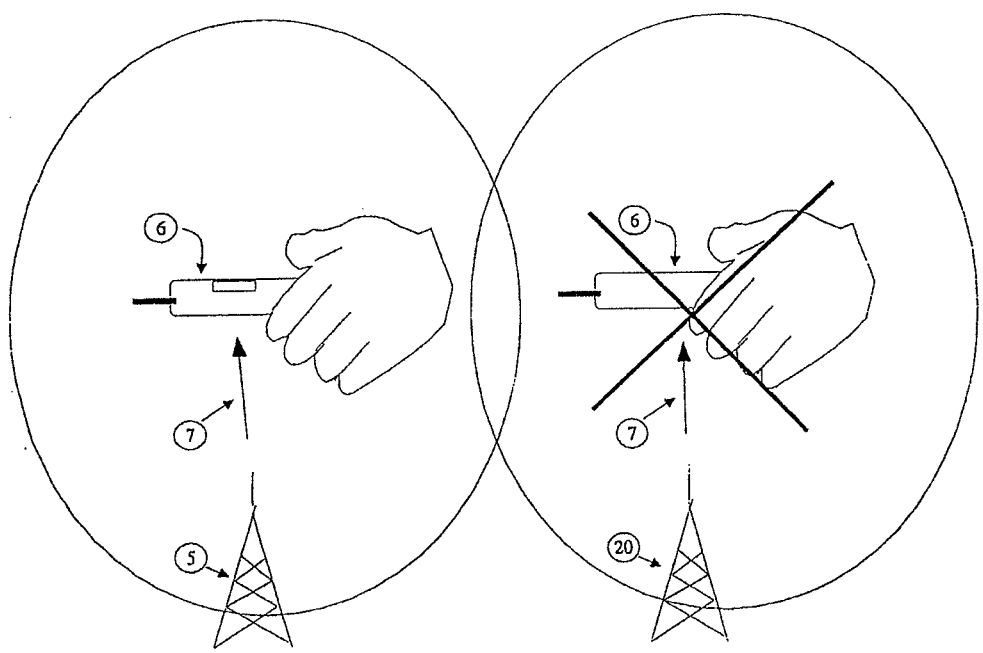
FIG. 4 shows the system in operation with a mobile phone.

FIG. 4 depicts the system in operation with a mobile phone. The protected device comprises a mobile phone 6 and a protection or security code 7 is provided by the base station information of a mobile phone network. The mobile phone detects whenever the user is within the range of whichever base station 5, 20 of a mobile phone network. This information is applied to control the protection of a mobile phone in such a way that, when the phone is for example within the range of a home base station, it is possible to make unrestricted calls but the programming of new numbers or the switching of a sim card is disabled. Respectively, when a mobile phone leaves the range of a home base station 5 and steps into the range of any other base station 20, the phone only enables calls to speed-dial, numbers. The programming of mobile phone numbers or the switching of a sim card can only be performed within the coverage range of the home base station 5 and with a right-of-use authorized charging unit, as described in reference to FIG. 2. Thus, the system enables protecting a mobile phone automatically, nor can it be loaded or put to full service except with its specific home base station and charging unit.

What is essential about the invention is the fact that, as location information in the process of granting operating authorities, the system utilizes the base station information of a mobile phone network and/or at close range a wired or wireless communication link, such as a bluetooth communication link.

The invention claimed is:

1. An automated control system for multi-level authority at a building, comprising:
    an electric device located at the building configured to be protected by security codes, the electric device having a first communication interface;
    an access control device fixedly installed at the building, the access control device having the first communication interface configured to communicate with the electric device, a second communication interface configured to communicate with a base station, the base station having a range covering the building, and a third communication interface for local communication; and
    a mobile transmitter configured to communicate with the base station, and having the third communication interface configured to communicate with the access control device,
    wherein the access control device is configured to detect a loss of connection with the mobile transmitter via the third communication interface when the mobile transmitter is moved out of a range of the third communication interface, and thereafter configured to send a first access code to the electric device via the first communication interface that limits access to functionalities of the electric device,
    wherein the access control device is further configured to receive a message from the base station when the mobile transmitter is moved out of the range of the base station, and thereafter configured to send a second access code to the electric device via the first communication interface that changes a setting of the electric device.

2. The automated control system according to claim 1, wherein
    the access control device is further configured to receive a first time use protection code from a manufacturer of the electric device to allow use of the electric device.

3. The automated control system according to claim 1, wherein
    the limitation of the access to functionalities of the electric device by the first access code includes an activation of a childproof lock.

4. The automated control system according to claim 1, wherein the electric device includes a heating system controller, and wherein the setting of the electric device that is changed by the second access code is a change of a setting of the heating system controller.

5. An automated control method performed on a system for multi-level authority, the system including,
    a device located at a building having a first communication interface,
    an access control device fixedly installed at the building, the access control device having the first communication interface configured to communicate with the electric device, a second communication interface configured to communicate with a base station, the base station having a range covering the building, and a third communication interface for local communication, and
    a mobile transmitter configured to communicate with the base station, and having the third communication interface configured to communicate with the access control device,
    the method comprises the steps of:
    detecting a loss of connection at the access control device with the mobile transmitter via the third communication interface when the mobile transmitter is moved out of a range of the third communication interface; and
    sending a first access code by the access control device to the electric device via the first communication interface that limits access to functionalities of the electric device, after said step of detecting,
    receiving a message at the access control device from the base station when the mobile transmitter is moved out of the range of the base station; and
    sending a second access code by the access control device to the electric device via the first communication interface that changes a setting of the electric device, after said step of receiving.

6. The automated control method according to claim 5, further comprising the step of: receiving a first time use protection code at the access control device via the second communication interface from a manufacturer of the electric device to allow use of the electric device.

7. The automated control method according to claim 5, wherein the limitation of the access to functionalities of the electric device by the first access code includes an activation of a childproof lock.

8. The automated control method according to claim 6, wherein the electric device includes a heating system controller, and wherein the setting of the electric device that is changed by the second access code is a change of a setting of the heating system controller.

* * * * *